Feb. 11, 1969   D. R. BOYLAN ET AL   3,427,124
METHOD OF PRODUCING DICALCIUM PHOSPHATE
Filed June 18, 1965

Inventors
DAVID R. BOYLAN
KUO K. FENG
Dawson, Tilton, Fallon
Lungmus & Alexander
Attorneys Inventors
David R. Boylan
Kuo K. Feng Inventors
David R. Boylan
Kuo K. Feng

United States Patent Office 3,427,124
Patented Feb. 11, 1969

3,427,124
METHOD OF PRODUCING DICALCIUM PHOSPHATE
David R. Boylan, Ames, Iowa, and Kuo Kang Feng, Arvida, Quebec, Canada, asignors to Iowa State University Research Foundation, Inc., Ames, Iowa, a corporation of Iowa
Continuation-in-part of application Ser. No. 55,022, Sept. 9, 1960. This application June 18, 1965, Ser. No. 478,000
U.S. Cl. 23—109   1 Claim
Int. Cl. C01b 25/32, 25/30

ABSTRACT OF THE DISCLOSURE

A method for the production of dicalcium phosphate by direct acidulation of phosphate rock utilizing a mixture of sulfuric and phosphoric acids wherein the formulation is determined by reference to a diagram of the quaternary system $CaSO_4$—$H_2SO_4$—$H_3PO_4$—$Ca_3(PO_4)_2$, the method employing steps which can be represented as a closed cycle on the diagram whereby once the method is operational, continuation is achieved through sequential additions of sulfuric acid and phosphate rock.

Background of invention

This application is a continuation-in-part of our copending application Ser. No. 55,022, filed Sept. 9, 1960, now abandoned.

In general, when phosphate rock is treated with sulfuric acid, monocalcium phosphate or phosphoric acid is formed. Theoretically, if less sulfuric acid is used, dicalcium phosphate should be formed. In practice, however, only monocalcium phosphate and undecomposed phosphate rock result. Both types of phosphate are effective plant foods, however dicalcium phosphate is considered more economical since it requires less sulfuric acid. Dicalcium phosphate can be produced by neutralizing phosphoric acid with limestone, but this process is of little interest because the cost of the raw material is relatively high. On the other hand, the cost of sulfuric acid and phosphate rock is much lower and it would therefore be desirable to provide a method of utilizing these relatively inexpensive reactants to produce dicalcium phosphate, and such constitutes an important object of this invention.

Another object of this invention is to provide a method for the production of dicalcium phosphate which is cyclic, employing alternating steps of reaction and separation utilizing sulfuric acid and phosphate rock as additives.

Still another object is to provide a method for the production of dicalcium phosphate utilizing sulfuric acid and phosphate rock as raw materials in which a basic approach is articulated toward solving the problems of direct acidulation, and equilibria information relative thereto is provided whereby others skilled in the art may determine suitable operating conditions.

Other objects and advantages of the invention may be seen in the details of operation set forth herein.

The invention is explained in conjunction with the accompanying drawings, in which—

Figure 4:
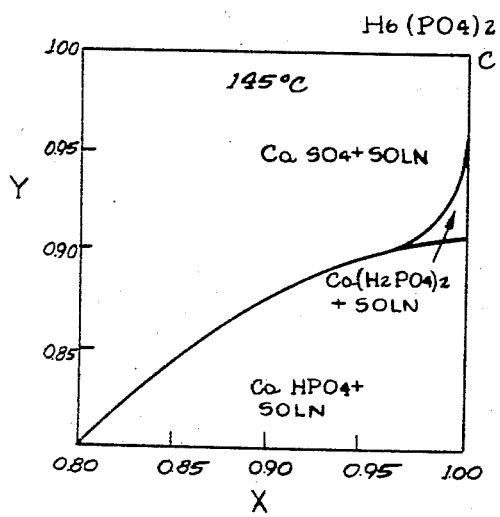
Figure 5:
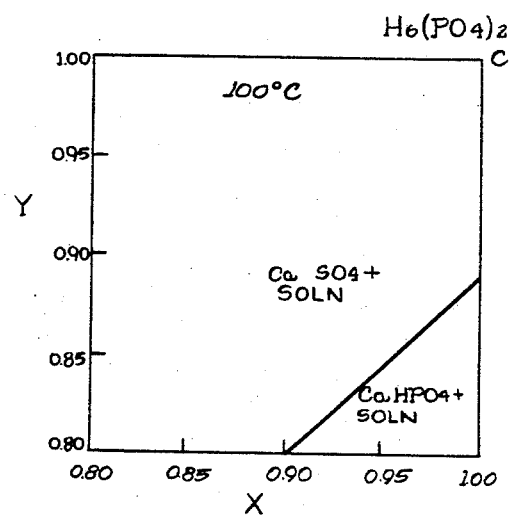
Figure 6:
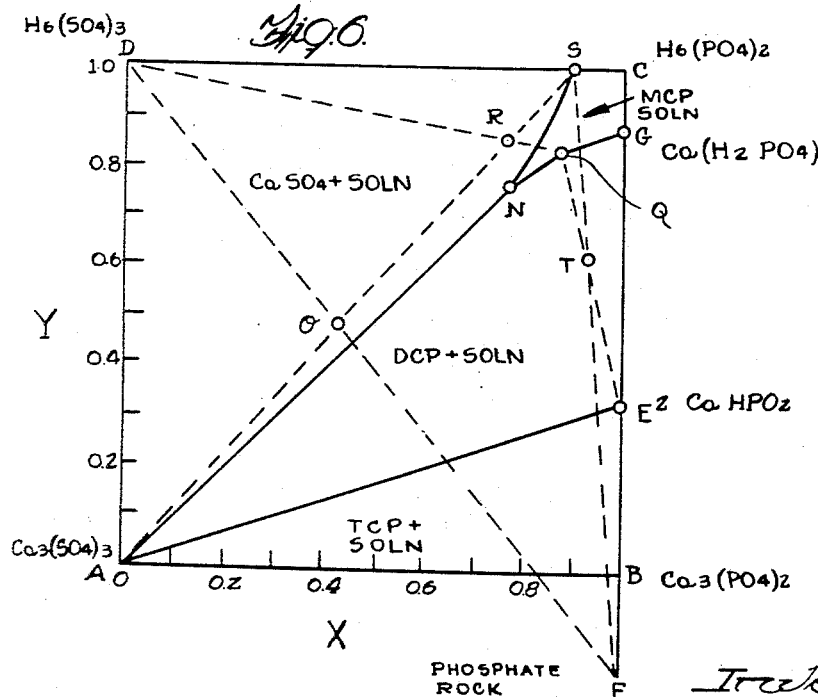
Figure 8:
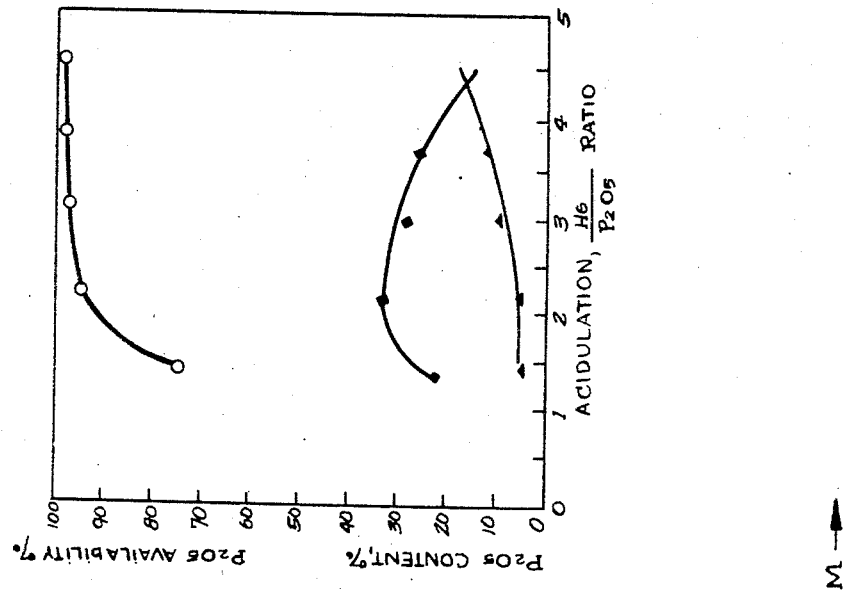
Figure 9:
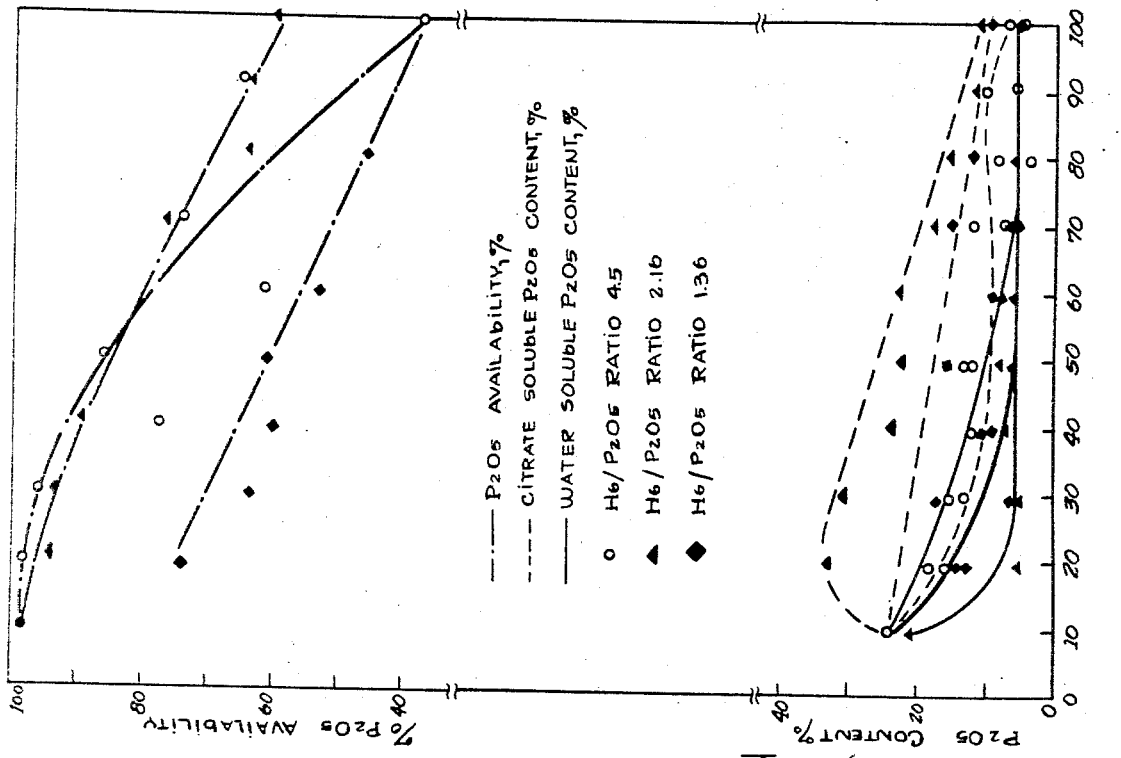
Figure 9:
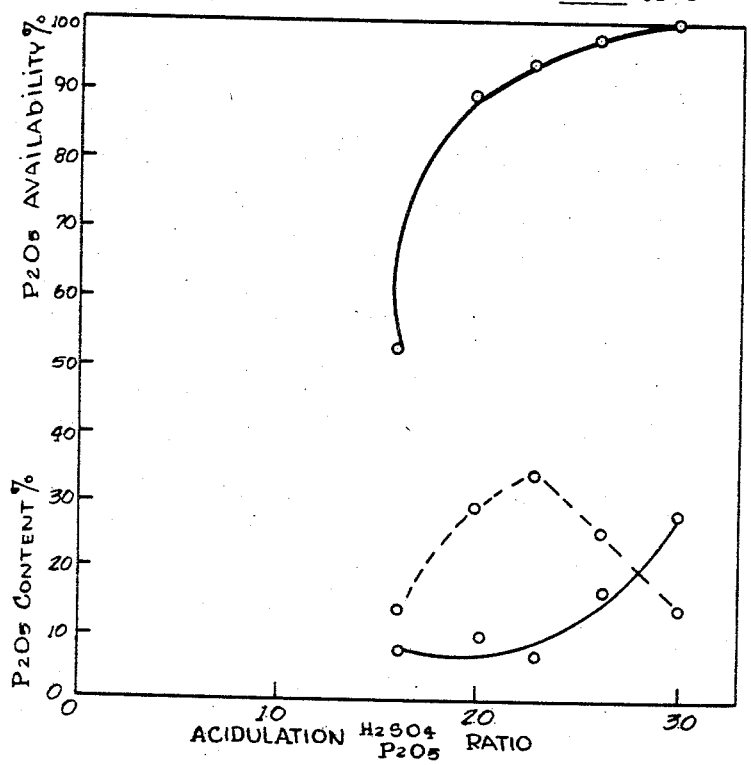
Figure 10:
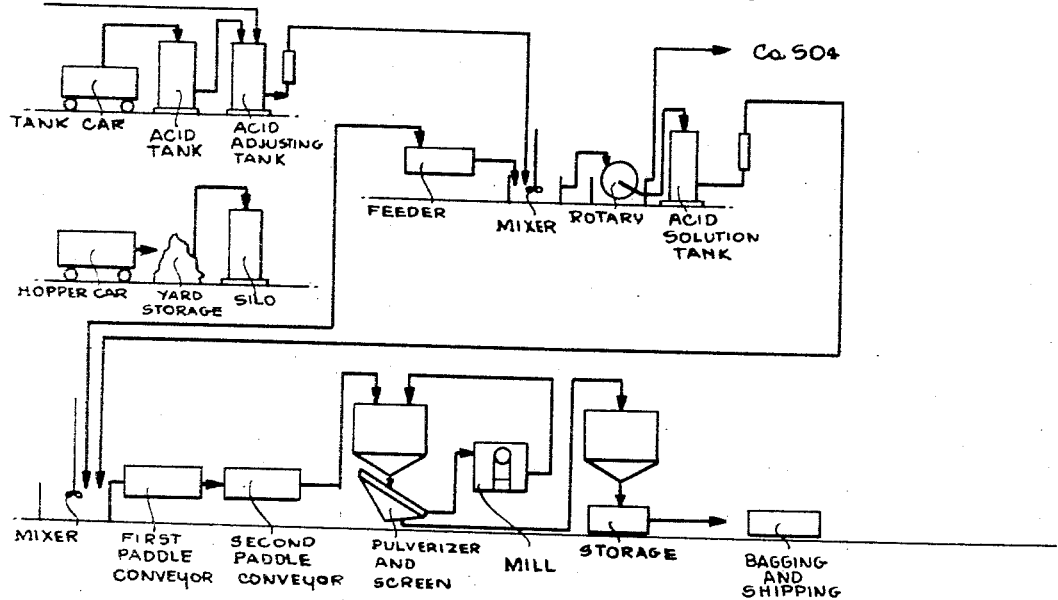

model in space; with X representing the number of $(PO_4)_2$ mols, Y as the number of $H_6$ moles, and M the moles of free water, and wherein the following abbreviations are used: CS for calcium sulfate, DCP for dicalcium phosphate, TCP for tricalcium phosphate, and soln. for solution;

FIG. 4 is a graph of an enlarged section of the upper righthand corner of FIG. 6 at 145° centigrade;

FIG. 5 is a graph like that of FIG. 4, but at 100° C.;

FIG. 6 is a graph of phase equilibria of the quaternary system $CaO$—$P_2O_5$—$SO_3$—$H_2O$; and wherein MCP stands for monocalcium phosphate;

FIG. 7 is a graph showing effect of the concentration of solutions on conversion at various $H_6/P_2O_5$ ratios;

FIG. 8 is a graph of the effect of $H_6/P_2O_5$ ratio on conversion;

FIG. 9 is a graph showing effect of the total acidulation ratio on conversion; and FIG. 10 is a flow sheet for the inventive process.

It is believed that those skilled in the art can best understand the inventive process through a preliminary consideration of the theoretical aspects thereof. In this connection, the acidulation of phosphate rock may be considered as a heterogeneous solid-liquid reaction wherein diffusion phenomena have an important influence. The acidulation may be visualized as a chemical reaction at the rock surface followed by diffusion of acid ions and products, the chemical reactions being:

Because of concentration differences, ions from the resulting solution diffuse through the boundary layer to the solid surface and the products of reaction diffuse through the boundary layer to the solution.

Since the value of the solubility product constants are very small, equilibrium is quickly established for dicalcium phosphate and calcium sulfate, and any unreacted phosphate rock is almost immediately covered with a layer of solid deposits of dicalcium phosphate or calcium sulfate. Removal of these solid products is therefore necessary for further conversion.

Besides the main component apatite, phosphate rock also contains calcium fluoride, iron, aluminum, magnesium, and calcium carbonate. Many side reactions will occur during the acidulation process. However, these side reactions are of secondary importance in the ordinary operation, being compensated for by a slight increase in the amount of acid employed over that theoretically required.

Figure 1:
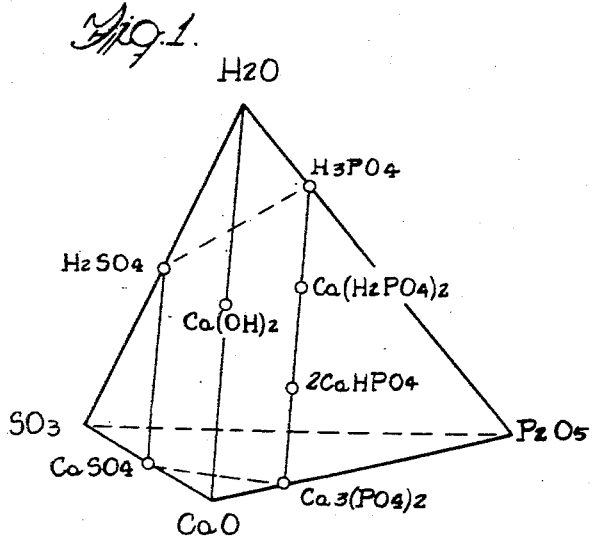
FIG. 1 is a graphical representation of the quaternary system $CaO$—$P_2O_5$—$SO_3$—$H_2O$ showing the trapezoidal planar relationship of the major compounds.
Figure 2:
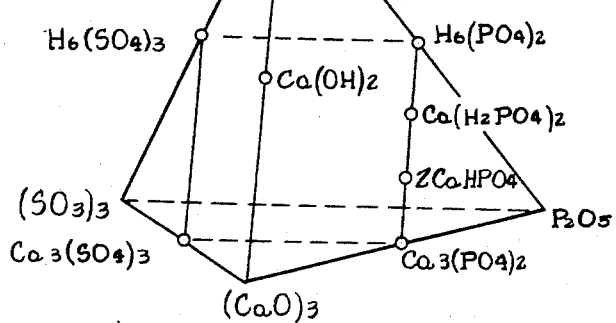
FIG. 2 is a similar representation of the system $(CaO)_3$—$(SO_4)_3$—$P_2O_5$—$(H_2O)_3$.

From the foregoing, it will be seen that the essential elements involved here are calcium, phosphorus, sulfur, hydrogen and oxygen which are conveniently articulated as quaternary system: $CaO$, $P_2O_5$, $SO_3$, $H_2O$. These four components may be represented graphically using an isothermal solid model (see FIG. 1). The construction of such a model makes use of the geometrical properties of a regular tetraherdon, the four corners of the tetrahedron being used to represent the $CaO$, $P_2O_5$, $SO_3$ and $H_2O$. Referring to FIG. 1, it will be seen that the compounds $CaSO_4$, $Ca_3(PO_4)_2$, $H_2SO_4$, and $H_3PO_4$ lie in a plane and the lines joining them form a trapezoid. If the corners in the regular tetrahedron represent the comonents $(CaO)_3$, $(SO_3)_3$, $P_2O_5$, $(H_2O)_3$, the plane joining the compounds $Ca_3(SO_4)_3$, $Ca_3(PO_4)_2$, $H_6(SO_4)_3$ and $$H_6(PO_4)_2$$

forms a square as shown in FIG. 2. $H_2O$ is expressed as moles per two moles total of $Ca_3(SO_4)_3$, $H_6(SO_4)_3$, $$H_6(PO_4)_2$$

and $Ca_3(PO_4)_2$ and is plotted vertically above the $$Ca_3(SO_4)_3$$

Figure 3:
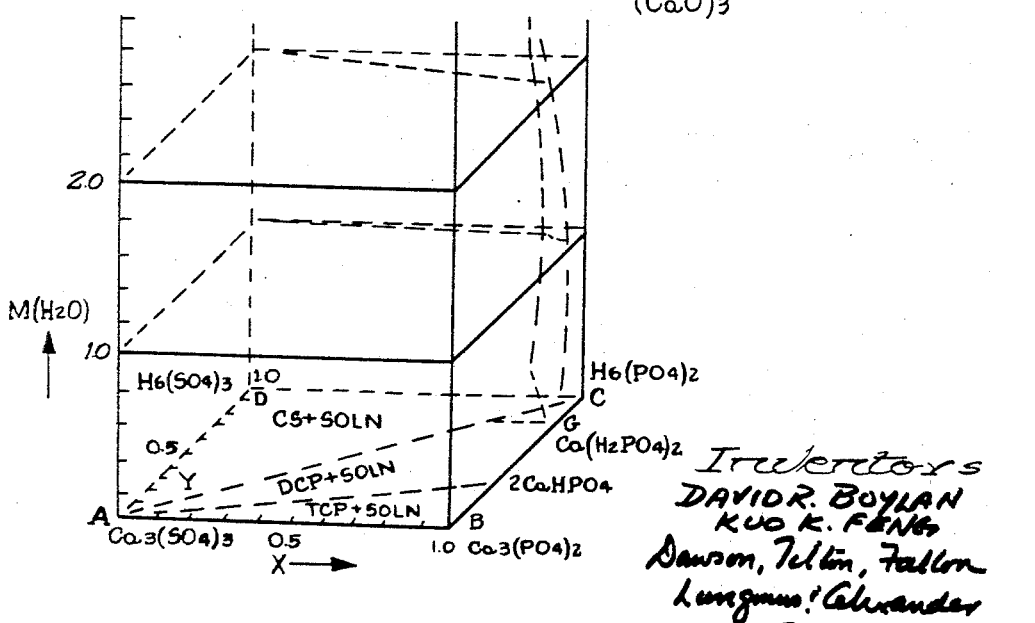
FIG. 3 is a representation of the modified $$CaO—P_2O_5—SO_3—H_2O$$

$H_6(SO_4)_3$, $H_6(PO_4)_2$ and $Ca_3(PO_4)_2$ base, forming an upright prism. FIG. 3 shows the resulting model. The position in the square base represents the mutual relationship between the amounts of $Ca_3(SO_4)_3$, $H_6(SO_4)_3$, $Ca_3(PO_4)_2$ and $H_6(PO_4)_2$. The position above the base represents the water content.

The solidus lines in FIGS. 3 and 6 were determined experimentally by investigating phase and solubility relationships. These relationships were determined in a constant temperature bath in which oil was used to maintain a temperature of 100° C. and a nonocombustible heat transfer medium, Arochor 1248, was used for 145° C. The temperature could be controlled with a precision of ±0.2 for 100° C. and ±0.4 for 145° C.

The mixtures were continuously rotated at 30 r.p.m. in a constant temperature bath. After seven days, the mixtures were allowed to settle at the equilibrium temperature for 24 hours.

Liquid samples were taken from the clear solutions. A preheated pipette at 105° C. was used for the 100° C. mixtures. For the 145° C. mixture, a sampling cup of a pressure bomb was dipped into the solution for sampling and withdrawn immediately, thereby separating the liquid sample for analysis later. Solid phase sampling was accomplished by filtering through a preheated sintered glass filter under suction for the 100° C. samples and by filtering through a pressure bomb under suction for the 145° C. sample.

Phosphorus pentoxide was determined by the colorimetric procedure of Bridger, Boylan and Markey, 25 Anal. Chem. 336, after making the solution according to the official method of the Association of Official Agricultural Chemists, 7th ed., 1950. Calcium oxide was determined by precipitation as oxalate. Sulfur trioxide was determined gravimetrically by precipitation as $CaSO_4$. Nitrogen was determined by the ferrous sulfate zinc-soda method set forth in the Official Methods of Analysis of the A.O.A.C., 7th ed., 1950. All analyses were made in duplicate and with checks using chemical reagents. To determine the nature of the solid phase, the rest analysis method was used with the addition of the calcium nitrate as a telltale substance. By this method, both the solution and the solid phase can be analyzed. The quantity of adhering liquid in the solid phase was calculated by using a calcium nitrate balance. The solid phases in the quaternary system were determined by X-ray diffraction.

The results of analyses are set forth in Tables I-V below:

TABLE I.—EQUILIBRIUM ANALYSES OF THE SYSTEM $CaO-SO_3-H_2O$ AT 100° C.

| Material charged* | Composition of solution in percentage by weight | | Value for— | | Solution saturated with respect to— |
|---|---|---|---|---|---|
| $H_2SO$, percent | CaO | $SO_3$ | 100† | m‡ | |
| 10.2 | 0.256 | 8.81 | 95.5 | 138 | $CaSO_4 \cdot \tfrac{1}{2}H_2O$ |
| 14.8 | 0.183 | 11.93 | 98.0 | 98 | $CaSO_4 \cdot \tfrac{1}{2}H_2O$ |
| 19.6 | 0.150 | 15.86 | 98.5 | 70 | $CaSO_4 \cdot \tfrac{1}{2}H_2O$ |
| 44.8 | 0.090 | 38.21 | 99.5 | 21 | $CaSO_4 \cdot \tfrac{1}{2}H_2O$ |
| 65.3 | 0.069 | 52.14 | 99.6 | 12 | $CaSO_4 \cdot \tfrac{1}{2}H_2O$, $CaSO_4$ |
| 87.3 | 0.041 | 70.38 | 99.8 | 5.3 | $CaSO_4$ |
| 94.7 | 0.030 | 76.27 | 99.9 | 4.2 | $CaSO_4$ |

*All mixtures were made using 50 cc. of $H_2SO_4$ of the indicated strength and 5 grams of $CaSO_4$.
†Expressed as total moles of $H_6$.
‡Expressed as moles per two moles total of $Ca_3(PO_4)$, $H_6(SO_4)_3$, $H_6(PO_4)_2$, $Ca_3(SO_4)_3$.

TABLE II.—EQUILIBRIUM ANALYSES OF THE SYSTEM $CaO-SO_3-H_2O$ AT 145° C.

| Material charged* | Composition of solution in percentage by weight | | Value for— | | Solution saturated with respect to— |
|---|---|---|---|---|---|
| $H_2SO_4 CaSO_4$, percent gm. | CaO | $SO_3$ | 100y† | m‡ | |
| 10.6 | 0.242 | 8.94 | 96.0 | 135 | $CaSO_4 \cdot \tfrac{1}{2}H_2O$, $CaSO_4$ |
| 17.4 | 0.209 | 14.07 | 96.1 | 81 | $CaSO_4 \cdot \tfrac{1}{2}H_2O$, $CaSO_4$ |
| 45.8 | 0.123 | 37.84 | 99.5 | 21 | $CaSO_4$ |
| 64.3 | 0.105 | 51.43 | 99.7 | 14 | $CaSO_4$ |
| 86.2 | 0.090 | 69.55 | 99.7 | 5.8 | $CaSO_4$ |
| 94.8 | 0.085 | 76.43 | 99.8 | 4.1 | $CaSO_4$ |

*All mixtures were made using 50 cc. of $H_3SO_4$ of the indicated strength and 5 grams of $CaSO_4$.
†Expressed as total moles of $H_6$.
‡Expressed as moles per two moles total of $CA_3(PO_4)$, $H_6(SO_4)_3$, $H_6(PO_4)_2$, $Ca_3(SO_4)_3$.

TABLE III.—EQUILIBRIUM ANALYSES OF THE SYSTEM $CaO-P_2O_5-H_2O$ AT 145° C.

| Material charged* | | Composition of solution in percent by weight | | Value for— | | Solution saturated with respect to— |
|---|---|---|---|---|---|---|
| $H_3PO_4$, percent | $Ca(H_2PO_4) \cdot H_2O$, gms. | CaO | $P_2O_5$ | 100† | m‡ | |
| 1.20 | 4.83 | 0.094 | 2.9 | 97.1 | 257 | $CaHPO_4$ |
| 4.30 | 11.92 | 0.98 | 10.1 | 91.8 | 70 | $CaHPO_4$ |
| 4.68 | 12.80 | 1.80 | 11.1 | 86.3 | 63 | $CaHPO_4$ |
| 5.25 | 19.86 | 1.81 | 14.0 | 95.8 | 47 | $CaHPO_4$ |
| 6.34 | 22.64 | 2.04 | 16.9 | 89.8 | 38 | $CaHPO_4$ |
| 12.80 | 23.06 | 2.25 | 20.0 | 95.2 | 33 | $CaHPO_4$ |
| 17.6 | 26.48 | 3.31 | 24.9 | 95.5 | 23 | $CaHPO_4$ |
| 19.4 | 26.37 | 2.85 | 26.7 | 90.9 | 21 | $CaHPO_4$ |
| 21.8 | 26.42 | 3.30 | 28.8 | 94.2 | 19 | $CaHPO_4$ |
| 22.6 | 26.44 | 3.60 | 29.9 | 95.9 | 8.8 | $CaHPO_4$ |
| 22.7 | 26.48 | 3.74 | 29.9 | 89.4 | 17 | $CaHPO_4$ |
| 26.3 | 26.45 | 3.84 | 33.3 | 96.1 | 15 | $CaHPO_4$ |
| 28.8 | 26.39 | 4.39 | 25.8 | 89.6 | 13 | $CaHPO_4$ |
| 28.7 | 26.58 | 4.37 | 35.8 | 95.9 | 12 | $CaHPO_4$ |
| 29.2 | 26.64 | 4.56 | 37.4 | 89.7 | 12 | $CaHPO_4$ |
| 35.4 | 26.65 | 4.84 | 37.1 | 89.0 | 12 | $CaHPO_4$ |
| 37.1 | 30.81 | 5.04 | 39.0 | 89.1 | 13 | $CaHPO_4$ |
| 40.3 | 25.12 | 5.27 | 44.0 | 89.9 | 9 | $CaHPO_4$, $Ca(H_2PO_4)_2$ |
| 40.3 | 25.43 | 5.30 | 44.1 | 89.9 | 9 | $CaHPO_4$, $Ca(H_2PO_4)_2$ |
| 43.9 | 25.36 | 5.58 | 45.7 | 89.3 | 8.4 | $CaHPO_4$, $Ca(H_2PO_4)_2$ |
| 47.4 | 25.35 | 4.37 | 51.6 | 72.2 | 6.7 | $Ca(H_2PO_4)_2$ |
| 62.5 | 16.34 | 3.21 | 57.1 | 98.1 | 5.5 | $Ca(H_2PO_4)_2$ |
| 75.6 | 14.21 | 1.81 | 63.1 | 97.5 | 4.4 | $Ca(H_2PO_4)_2$ |
| 85.0 | 14.36 | 1.35 | 66.6 | 98.3 | 3.8 | $Ca(H_2PO_4)_2$ |

*All mixtures were made using 50 cc. of $H_3PO_4$ of the indicated strength and the indicated weight of $Ca(H_2PO_4)_2 \cdot H_2O$.
†Expressed as total moles of $H_6$.
‡Expressed as moles per two moles total of $Ca_3(PO_4)_3$, $H_6(SO_4)_3$, $H_6(PO_4)_2$, $Ca_3(SO_4)_3$.

TABLE IV.—EQUILIBRIUM ANALYSES OF THE SYSTEM CaO-P$_2$O$_5$-SO$_3$-H$_2$O AT 100° C.

| Material charged* | | | Composition of solution in percent by weight | | | Values for— | | | Solution saturated with respect to— |
|---|---|---|---|---|---|---|---|---|---|
| Solution, percent | | Solid Added | | | | | | | |
| H$_3$PO$_4$ | H$_2$SO$_4$ | | CaO | P$_2$O$_5$ | SO$_3$ | 100x† | 100y‡ | m$^s$ | |
|  | 2.2 | D.** | 0.095 | 0.09 | 0.125 | 54.6 | 54.6 | 5,020.0 | D.C.H.C.D.** |
|  | 2.0 | T. | 0.100 | 0.12 | 0.08 | 72.7 | 45.5 | 5,020.0 | D.C.H. |
|  | 1.8 | T. | 0.113 | 0.16 | 0.11 | 61.2 | 56.2 | 3,450.0 | D.C.H.C.D. |
| 34.5 | 3.7 | M. | 0.35 | 4.60 | 0.19 | 97.5 | 93.5 | 171.0 | D.C.H. |
| 2.0 | 4.2 | D. | 0.908 | 6.56 | 0.210 | 98.2 | 88.7 | 120.0 | D.C.H. |
| 4.2 | 3.7 | D. | 2.04 | 7.6 | 0.04 | 99.8 | 79.3 | 86.3 | D.C.H. |
| 5.0 | 3.7 | D. | 0.76 | 8.29 | 0.202 | 99.5 | 98.0 | 25.5 | D.C.H. |
| 4.8 | 3.7 | D. | 0.75 | 8.10 | 0.201 | 99.0 | 95.0 | 55.5 | D.C.H. |
| 4.1 | 3.7 | D. | 1.22 | 10.36 | 0.206 | 98.8 | 90.4 | 67.2 | D.C.H. |
| 6.0 | 3.7 | D. | 1.52 | 12.83 | 0.274 | 98.5 | 87.9 | 64.2 | D.C.H. |
| 6.3 | 3.7 | M. | 1.82 | 14.60 | 0.20 | 98.5 | 80.2 | 85.7 | D.C.H.C.A. |
| 20.8 | 3.7 | M. | 2.62 | 17.80 | 0.15 | 99.5 | 93.7 | 17.7 | D.C.A.C.H. |
| 2.7 | 3.7 | M. | 3.20 | 21.20 | 0.15 | 99.7 | 87.3 | 27.9 | D.C.A.C.H. |
| 8.6 | 3.7 | D. | 4.01 | 27.80 | 0.10 | 99.3 | 57.5 | 65.8 | D.C.A.C.H. |
| 15.3 | 3.7 | D. | 5.13 | 29.80 | 0.09 | 100.0 | 86.0 | 17.1 | D.C.A.C.H. |
| 8.2 | 3.7 | M. | 5.88 | 30.80 | 0.09 | 98.5 | 66.0 | 34.1 | D.C.A.C.H. |
| 24.1 | 3.7 | D. | 6.20 | 32.50 | 0.08 | 100.0 | 84.0 | 14.8 | D.C.A.C.H. |
| 16.8 | 3.7 | M. | 6.60 | 36.00 | 0.12 | 99.8 | 82.1 | 14.6 | D.C.A.C.H. |
| 30.8 | 3.7 | M. | 7.10 | 37.5 | 0.07 | 100.0 | 84.0 | 11.7 | D.C.A. |
| 36.2 | 3.7 | M. | 6.50 | 40.1 | 0.06 | 100.0 | 80.6 | 10.5 | D.M.M.C.A. |
| 37.4 | 3.7 | M. | 5.50 | 42.9 | 0.06 | 100.0 | 89.0 | 9.5 | D.M.M.C.A. |
| 38.6 | 3.7 | M. | 5.00 | 45.1 | 0.04 | 100.0 | 90.4 | 8.7 | M.M. C.A. |
| 38.8 | 3.7 | M. | 4.20 | 47.2 | 0.02 | 100.0 | 92.4 | 8.1 | M.M. C.A. |
| 14.2 | 3.7 | D. | 3.08 | 51.3 | 0.04 | 100.0 | 92.8 | 6.5 | M.M. C.A. |
| 30.4 | 3.7 | D. | 2.74 | 55.2 |  | 100.0 | 95.4 | 6.0 | M.M. C.A. |
| 40.9 | 3.7 | M. | 1.90 | 56.5 |  | 100.0 | 97.3 | 5.8 | M. C.A. |
| 50.6 | 3.7 | M. | 1.70 | 58.4 |  | 100.0 | 98.0 | 5.4 | M. C.A. |
| 53.8 | 3.7 | M. | 0.91 | 62.6 |  | 100.0 | 98.7 | 4.6 | M. C.A. |
| 55.1 | 3.7 | M. | 0.52 | 65.2 |  | 100.0 | 97.2 | 4.1 | M. C.A. |
| 56.8 | 3.7 | M. | 0.30 | 67.6 |  | 100.0 | 99.6 | 3.7 | M. C.A. |

*All mixtures were made using 50 cc. of solution of indicated composition and 10 grams of indicated material.
†Expressed as total moles of (PO$_4$)$_2$.
‡Expressed as total moles of H$_6$.
s$^s$ Expressed as moles per two moles total Ca$_3$(PO$_4$)$_3$, H$_6$(SO$_4$)$_3$H$_6$(PO$_4$)$_2$, Ca$_3$(SO$_4$)$_3$.
**D=CaHPO$_4$; M=Ca(H$_2$PO$_4$)$_2$; T=Ca$_3$(PO$_4$)$_2$; M.M.=Ca(H$_2$P$_4$O)$_2$.H$_2$O; C.A.=CaSO$_4$; C.D.=CaSO$_4$.H$_2$O; and C.H.=CaSO$_4$.½H$_2$O TABLE V.—EQUILIBRIUM ANALYSES OF THE SYSTEM CaO-P$_2$O$_5$-SO$_3$-H$_2$O AT 145° C.

| Material charged* | | | Composition of solution in percent by weight | | | Values for— | | | Solution saturated with respect to— |
|---|---|---|---|---|---|---|---|---|---|
| Solution, percent | | Solid added | | | | | | | |
| H$_3$PO$_4$ | H$_2$SO$_4$ | | CaO | P$_2$O$_5$ | SO$_3$ | 100x† | 100y‡ | m$^s$ | |
|  | 2.4 | T.** | 0.14 | 0.44 | 0.16 | 81.0 | 79.2 | 1,440.00 | D.C.H.** |
|  | 4.4 | T. | 0.24 | 1.73 | 0.43 | 87.2 | 89.8 | 379.00 | D.C.H. |
|  | 6.7 | T. | 0.26 | 2.14 | 0.52 | 91.5 | 91.3 | 300.00 | D.C.H. |
|  | 8.9 | T. | 0.48 | 3.88 | 0.57 | 97.7 | 90.5 | 177.00 | D.C.H. |
|  | 11.1 | T. | 0.51 | 4.02 | 0.61 | 92.0 | 90.2 | 170.00 | D.C.H. |
| 4.6 | 3.75 | D. | 1.01 | 6.15 | 0.83 | 89.0 | 83.7 | 105.00 | D.C.H. |
| 10.0 | 3.75 | D. | 1.53 | 12.70 | 1.02 | 95.5 | 90.5 | 50.00 | D.C.H.C.A. |
| 13.7 | 3.75 | D. | 1.67 | 13.50 | 1.04 | 99.5 | 90.2 | 47.00 | D.C.H.C.A. |
| 21.2 | 3.75 | D. | 1.82 | 14.90 | 1.07 | 96.0 | 90.0 | 42.00 | D.C.H. |
| 28.4 | 3.75 | D. | 1.90 | 15.30 | 1.21 | 95.5 | 90.5 | 40.00 | D.C.H.C.A. |
| 30.0 | 3.75 | D. | 2.01 | 16.40 | 1.24 | 95.7 | 90.2 | 37.00 | D.C.H.C.A. |
| 40.0 | 3.75 | D. | 2.27 | 18.40 | 1.25 | 96.0 | 90.0 | 32.00 | D.C.H.C.A. |
| 41.5 | 3.75 | D. | 2.28 | 18.65 | 1.25 | 96.4 | 90.2 | 32.00 | D.C.H.C.A. |
| 41.5 | 3.75 | D. | 2.28 | 18.70 | 1.25 | 96.3 | 90.2 | 32.00 | M.D.C.H.C.A. |
| 45.0 | 3.75 | D. | 3.25 | 28.30 | 1.27 | 97.8 | 91.2 | 18.00 | D.C.H.C.A. |
| 46.0 | 3.75 | M. | 3.27 | 28.76 | 1.27 | 96.6 | 90.7 | 17.00 | M.D.C.H.C.A. |
| 54.0 | 3.75 | M. | 4.19 | 36.70 | 1.10 | 98.2 | 90.5 | 9.60 | D.C.A. |
| 56.2 | 3.75 | M. | 5.02 | 43.10 | 0.75 | 99.2 | 90.6 | 6.30 | D.C.A. |
| 61.4 | 3.75 | M. | 5.51 | 47.60 | 0.47 | 99.4 | 90.8 | 4.96 | D.M.C.A. |
| 64.3 | 3.75 | M. | 5.50 | 47.10 | 0.51 | 99.4 | 90.2 | 5.11 | D.M.C.A. |
| 66.8 | 3.75 | M. | 4.27 | 51.00 | 0.27 | 99.7 | 93.0 | 4.07 | M.C.H.C.A. |
| 70.1 | 3.75 | M. | 3.51 | 53.68 | 0.13 | 99.8 | 94.6 | 3.42 | M.C.A. |
| 72.4 | 3.75 | M. | 3.21 | 56.04 | 0.05 | 99.8 | 95.2 | 2.87 | M.C.A. |
| 76.8 | 3.75 | M. | 2.34 | 60.31 |  | 100.0 | 96.7 | 2.01 | M.C.A. |
| 80.2 | 3.75 | M. | 1.06 | 64.46 |  | 100.0 | 98.6 | 1.52 | M.C.A. |

*All mixtures were made using 50 cc. of solution of indicated composition and 10 grams of indicated material.
†Expressed as total moles of (PO$_4$)$_2$.
‡Expressed as total moles of H$_6$.
s$^s$ Expressed as moles per two moles total Ca$_3$(PO$_4$)$_3$, H$_6$(SO$_4$)$_3$H$_6$(PO$_4$)$_2$, Ca$_3$(SO$_4$)$_3$.
**D=CaHPO$_4$, M=Ca(H$_2$PO$_4$)$_2$, M.M.=Ca(H$_2$PO$_4$)$_2$.H$_2$O, T=Ca$_3$(PO$_4$)$_2$, C.A.=CaSO$_4$, C.H.=CaSO$_4$.½H$_2$O, C.D.=CaSO$_4$.2H$_2$O The experimental data gives the composition of the solution as weight percent of CaO, P$_2$O$_5$, SO$_3$ and H$_2$O (by difference). Ca$_3$, (SO$_3$)$_3$, (PO$_4$)$_2$ and H$_6$ are calculated from the percent of CaO, SO$_3$, P$_2$O$_5$ and H$_2$O. If the amount of (PO$_4$)$_2$ is specified as $x$ moles, of (SO$_4$)$_3$ as $1-x$ moles, of H$_6$ as $y$ moles, and of Ca$_3$ as $1-y$ moles, the total amount is therefore 2 moles. The amount of free water, $m$, which is not contained in the constituting water of the sulfuric acid and phosphoric acid is then expressed as moles per 2 moles of total (PO$_4$)$_2$, (SO$_3$)$_3$, H$_6$ and Ca$_3$.

The square base of the solid model of the phase diagram at 145° C., has been shown (not to scale) in FIGURE 6. This diagram can be used to propose a process for the preparation of dicalcium phosphate, indicated by the dotted lines. In the diagram, composition Q represents a saturated solution with respect to dicalcium phosphate at 145° C. Sulfuric acid may be added to this solution until the composition R is reached, the ratio of sulfuric acid to solution Q being QR/DR. Most of the calcium sulfate will be immediately precipitated and the composition of the solution becomes S. Phosphate rock can then be added to the solution S until composition T is obtained, where dicalcium phosphate precipitates and the composition of the solution again becomes Q. The amount of sulfuric acid and phosphate rock per cycle, converted to dicalcium phosphate and calcium sulfate corresponds to the equation:

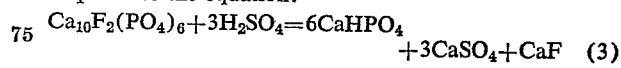

$$Ca_{10}F_2(PO_4)_6 + 3H_2SO_4 = 6CaHPO_4 + 3CaSO_4 + CaF \quad (3)$$

This represents a considerable saving in the consumption of sulfuric acid over that required to produce monocalcium phosphate in the normal superphosphate processes. Reaction (3) shows a theoretical acid consumption of 1.0 mol $H_2SO_4$ per mol of $P_2O_5$. The normal superphosphate process requires theoretical consumption of 2.0, as shown by the reaction (4):

$$Ca_{10}F_2(PO_4)_6 + 6H_2SO_4 = 3CaH_2(PO_4)_2 + 6CaSO_4 + CaF_2 \quad (4)$$

In addition to the theoretical acid consumption in the reaction (4), some acid is consumed by reaction with the impurities in the phosphate rock. In practice, this amounts to about 0.6 mol of acid per mol of $P_2O_5$. In applying the cyclic process, there are theoretically required 1.6 moles of acid per mol of $P_2O_5$. This means that the amount of sulfuric acid required would be only 61.5 percent as great as that necessary for normal superphosphate process used.

Since the point Q in FIG. 6 is not fixed, it can be set as favorable as possible. The point Q is determined by the amount of the product which is produced per liter of solution per cycle. Actually it will depend on the rate of conversion from phosphate rock to dicalcium phosphate. In order to obtain a high rate of conversion, the circulating liquid of the cyclic process must be satisfied by the following requirements:

(1) The concentration of the $H^+$ ions of solution Q should be as high as possible.

(2) The concentration of the $Ca^{++}$ ions of solution Q should be as low as possible.

As a result of the equilibrium studies of the $CaO = P_2O_5 = SO_3 = H_2O$ system, a process is proposed for the manufacture of dicalcium phosphate. The process consists of acidulating phosphate rock (F) with sulfuric acid (D) and removing $CaSO_4$ (A) by filtration. Additional phosphate rock (F) is added to the filtrate (S) to produce a solid product containing dicalcium phosphate (E), which is separated by a second filtration at the boiling point. The filtrate is fortified with weak sulfuric acid, and $CaSO_4$ is again precipitated. This filtrate is used for subsequent conversion.

The process was investigated on a laboratory scale. The variables studied were the concentration of solution S indicated in the diagram FIG. 6, the acidulation ratio, and the position T in the diagram FIG. 6. 100 grams of phosphate rock were used in each experiment.

The phosphate rock used in this study was obtained from Davison Chemical Corporation plant at Perry, Iowa. The chemical composition and screen analysis are given in Table VI. The sulfuric acid used was industrial grade purchased from Baker and Adamson Company.

The laboratory experiments were carried out in a small one-liter, closed Pyrex mixer mounted with vertical condensers to reflux any escaping water vapors. The mixer was surrounded by a Glas Col heater. The general procedure was as follows:

(a) A slurry from sulfuric acid and phosphate rock was prepared with varying concentration of free water, $m$. An acidulation ratio 3.34 by weight or 4.83 by mole was used. Liquid and solids were separated by filtration. The filtrate was designated S (FIG. 6).

(b) Phosphate rock and solution S were mixed in varying $H_6/P_2O_5$ mole ratios. This was accomplished in a Pyrex glass mixer with the wall temperature of the Pyrex glass maintained between 180–190° C. (The boiling point is about 103° C.) The mixture was agitated by a stirrer inserted through a vertical condenser tube. The mixing time was about fifteen minutes.

(c) The mixtures at the boiling temperature were filtered in a preheated Buchner-type funnel. The solids from this filtration contained monocalcium phosphate and dicalcium phosphate and analyzed about 40% total $P_2O_5$.

(d) The filtrate was fortified with 40% sulfuric acid to precipitate the calcium ion as calcium sulfate.

(e) The precipitated $CaSO_4$ was separated from the solution by filtration. The filtrate was again solution S.

TABLE VI.—ANALYSIS OF FLORIDA PHOSPHATE ROCK (DRY BASIS)

| Chemical constituent: | Weight percent |
|---|---|
| $P_2O_5$ | 33.2 |
| CaO | 47.8 |
| MgO | 0.4 |
| F | 4.2 |
| $Fe_2O_3$ | 1.1 |
| $Al_2O_3$ | 1.2 |
| $SiO_2$ | 9.1 |
| Moisture | 0.6 |

| Screen size, mesh: | |
|---|---|
| +65 | 0. |
| −65+100 | 2.6 |
| −100+150 | 11.0 |
| −150+200 | 24.9 |
| −200 | 61.5 |

Table VII indicates that the concentration of solution S has a great effect on the $P_2O_5$ content. The values are all decreased by increasing $m$ values (FIGURE 9). The maximum value of citrate soluble $P_2O_5$ occurs when $m=20$ and the $H_6/P_2O_5$ ratio = 2.16.

The position of point T (FIGURE 6) can be best represented by the ratio of FT/TS, which is the mole ratio of solution S to phosphate rock added. Five ratio values, 4.5, 3.7, 3.0, 2.16 and 1.36 at $m-20$ were used. The results in Table VII show that a ratio of 2.16 gave a maximum citrate soluble $P_2O_5$ content of 33.8%. This was equivalent to 94% $P_2O_5$ availability. $P_2O_5$ availability and the total $P_2O_5$ in the solution were increased by increasing the $H_6/P_2O_5$ ratio (FIGURE 10).

TABLE VII.—RESULTS OF ACIDULATION OF PHOSPHATE ROCK WITH SOLUTIONS

| Mol Ratio FT*/TS† | m** | Density, g./c.c. | Total $P_2O_5$, percent | Total $P_2O_5$ | Water soluble $P_2O_5$ | Citrate insol. $P_2O_5$ | Citrate soluble $P_2O_5$‡ | Available $P_2O_5$♣ | $P_2O_5$ Availability |
|---|---|---|---|---|---|---|---|---|---|
| 4.5 | 100 | 1.190 | 19.9 | 48.6 | 23.7 | 0.2 | 24.7 | 48.4 | 99.6 |
| 4.5 | 20 | 1.263 | 24.3 | 35.0 | 18.3 | 0.4 | 16.3 | 34.6 | 98.8 |
| 4.5 | 30 | 1.196 | 20.7 | 31.2 | 15.0 | 1.5 | 148. | 29.8 | 95.5 |
| 4.5 | 70 | 1.107 | 11.1 | 24.0 | 6.1 | 6.5 | 11.4 | 17.5 | 73.0 |
| 4.5 | 100 | 1.064 | 6.7 | 22.0 | 2.4 | 13.5 | 6.0 | 8.4 | 38.1 |
| 2.16 | 10 | 1.169 | 25.6 | 43.0 | 20.4 | 0.9 | 21.7 | 42.1 | 97.8 |
| 2.16 | 20 | 1.196 | 20.1 | 41.4 | 5.4 | 2.2 | 33.8 | 39.2 | 94.6 |
| 2.16 | 30 | 1.194 | 19.3 | 39.2 | 5.3 | 2.4 | 31.5 | 31.8 | 94.0 |
| 2.16 | 50 | 1.142 | 14.6 | 33.5 | 6.8 | 4.3 | 22.4 | 39.2 | 87.2 |
| 2.16 | 90 | 1.096 | 8.8 | 26.7 | 5.4 | 9.4 | 11.9 | 17.3 | 64.8 |
| 1.36 | 20 | 1.145 | 14.4 | 39.5 | 14.5 | 10.2 | 14.8 | 29.3 | 74.4 |
| 1.36 | 30 | 1.150 | 17.4 | 36.0 | 6.5 | 12.6 | 16.9 | 23.4 | 65.1 |
| 1.36 | 50 | 1.139 | 12.0 | 34.4 | 5.8 | 13.1 | 15.5 | 21.3 | 61.8 |
| 1.36 | 80 | 1.114 | 12.9 | 32.3 | 5.0 | 15.5 | 11.3 | 16.8 | 52.0 |
| 1.36 | 100 | 1.092 | 10.9 | 31.2 | 3.6 | 18.7 | 8.9 | 12.5 | 40.1 |

*The T point is shown on Figure 10.
†$H_6/P_2O_5$ is the ratio of solution S to phosphate rock added or line of FT/TS shown on Figure 3.
**m is used to design concentration of free water per two moles of $H_6(SO_4)_3$, $Ca_3(SO_4)_3$, $H_6(PO_4)_2$ and $Ca_3(PO_4)_2$ in solution.
‡Citrate soluble $P_2O_5$=total $P_2O_5$-water soluble $P_2O_5$-citrate insoluble $P_2O_5$.
♣Available $P_2O_5$=total $P_2O_5$-citrate insoluble $P_2O_5$.

An important factor in any acidulation process is the consumption of acid or the total acidulation ratio. For this process five total molar acidulation ratios were used, 3.0, 2.6, 2.3, 2.1 and 1.6. A total molar acidulation ratio of 2.3 gave a maximum citrate soluble $P_2O_5$ content of 33.2% as indicated in Table IX and FIGURE 9. This represents a considerable savings in the consumption of sulfuric acid over that required to produce mono-calcium phosphate in the normal superphosphate processes, where 2.6 moles of sulfuric acid per mole of $P_2O_5$ is required.

TABLE VIII.—RESULTS OF VARYING $H_6/P_2O_5$ RATIO

| $H_6/P_2O_5$ ratio | Solution Total $P_2O_5$ | Analysis, percent | | | | | |
|---|---|---|---|---|---|---|---|
| | | Solid Product | | | | | $P_2O_5$ availability |
| | | Total $P_2O_5$ | Water sol. $P_2O_5$ | Citrate insol. $P_2O_5$ | Citrate sol. $P_2O_5$ | Available $P_2O_5$ | |
| 4.5 | 24.3 | 35.0 | 18.3 | 0.4 | 16.3 | 34.6 | 98.8 |
| 3.7 | 24.0 | 40.1 | 14.5 | 0.8 | 24.8 | 39.3 | 98.0 |
| 3.0 | 22.6 | 40.8 | 11.5 | 1.2 | 28.1 | 39.6 | 97.0 |
| 2.16 | 20.1 | 41.4 | 5.4 | 2.2 | 33.8 | 39.2 | 94.6 |
| 1.36 | 14.4 | 39.4 | 6.5 | 10.2 | 22.8 | 39.3 | 74.4 |

TABLE IX.—RESULTS OF VARYING TOTAL ACIDULATION RATIO

| Total acid ratio | $H_6/P_2O_5$ ratio | Total $P_2O_5$ | Water sol. $P_2O_5$ | Citrate insol. $P_2O_5$ | Citrate sol. $P_2O_5$ | Available $P_2O_5$ | $P_2O_5$ availability |
|---|---|---|---|---|---|---|---|
| 3.0 | 2.1 | 40.5 | 26.8 | 0. | 13.7 | 40.9 | 100. |
| 2.6 | 2.1 | 41.2 | 16.1 | 1.0 | 24.1 | 40.2 | 97.6 |
| 2.3 | 2.1 | 41.6 | 5.8 | 2.6 | 33.2 | 39.0 | 93.8 |
| 2.0 | 2.1 | 40.6 | 9.0 | 4.3 | 29.3 | 36.3 | 88.9 |
| 1.6 | 2.1 | 40.9 | 7.8 | 20.2 | 12.9 | 20.7 | 51.0 |

The laboratory results were checked in a pilot plant operation which included a mixer, settling tanks and conveyors.

One hundred mesh phosphate rock and 40% sulfuric acid were mixed in a settling tank in a mole acidulation ratio of 4.83. The mix was allowed to remain in the tank 24 hours. The supernatant acid solution flowed to a storage tank by gravity. It was then introduced to process by a stainless steel pump.

Phosphate rock was fed with a vibrator feeder and was mixed with the acid solution from the settling tank in an acidulation mole ratio of 1.0. The second filtration step was omitted by addition of more rock and use of a paddle conveyor as a converter.

The material passed through the first and second conveyor essentially in granular form. The steam pressure in the jacket of each conveyor was about 80 p.s.i., and a temperature of about 165° C. was measured inside the conveyor by thermocouples. Exhaust vapors from the continuous mixer and the conveyors were removed by an air jet and discharged from the building.

The ratio of phosphate rock to total acid used was 2.3 by mole or 1.58 by weight. A dried product having 40% total $P_2O_5$ 89% $P_2O_5$ availability and low free acid was obtained.

As a result of the pilot plant work, an industrial process for manufacture of fertilizer grade di-calcium phosphate by direct acidulation of phosphate rock is available (FIG. 10). The product would be either 0–40–0 or 0–22–0 depending on the disposition of the by-product $CaSO_4$.

In this process ground phosphate rock is unloaded from hopper cars, stored in silos, and metered to process by a belt or vibrating feeder. Sulfuric acid, 66 Be', is delivered in tank cars and stored in steel tanks. It is pumped to process and metered by a rotameter.

The rock and acid are reacted in an agitated tank to produce a phosphoric acid solution and a solid by-product of $CaSO_4$. The precipitated $CaSO_4$ and impurities are separated from the acid solution by a rotary vacuum or other filter.

Additional phosphate rock is then added to the filtrate from the $CaSO_4$ separation and subsequently reacted in a series of paddle conveyors. The product from the last conveyor is finished grade, 0–40–0, requiring no curing and would be screened, stored and packaged.

The precipitated calcium sulfate from the first acidulation can be mixed with the solids from the last conveyor, if desired, to produce a product containing 22 percent $P_2O_5$ in granular form.

The advantages of this process are:

(a) A considerable saving in the amount of sulfuric acid over that required to produce monocalcium phosphate in the normal superphosphate processes.

(b) The product requires no further curing and can be bagged and shipped directly. (This reduces the required storage facilities and working capital tied up in inventory.)

(c) The process can be operated on a continuous basis and can produce a granular product.

From the foregoing, it will be seen that dicalcium phosphate can be produced by direct acidulation of phosphate rock and optimum results are achieved at a temperature of about 145° C. The procedure can be practiced beneficially in the range 100–175° C., lower temperatures resulting in the preferential production of monocalcium phosphate and higher temperatures in the pyrophosphate.

Optimally 2.3 moles of sulfuric acid are employed for each mole of $P_2O_5$, the sulfuric acid being partially converted to phosphoric acid (solution S). The ratio of phosphoric acid to sulfuric acid in solution S may vary from 3 to 9. The range of concentration of solution S, can be approximated from FIGURE 4 which is an enlarged section of the upper right hand corner of FIGURE 6—the latter drawn out of scale for the sake of clarity. Solution S is defined by the phase boundary between the $CaSO_4$ +soln and the $CaH_2PO_4$+soln regions. The range of concentration of this line is the range of concentration of solution S. A table of the coordinates of this line is set down below as Table X.

TABLE X

| $H_6(PO_4)_2$ | $Ca_3(PO_4)_2$ | $H_6(SO_4)_3$ | $Ca_3(SO_4)_3$ |
|---|---|---|---|
| 1.0 | 0.04 | 0.96 | 0.00 |
| 0.995 | 0.06 | 0.94 | 0.005 |
| 0.99 | 0.08 | 0.92 | 0.01 |
| 0.98 | 0.09 | 0.91 | 0.02 |
| 0.96 | 0.10 | 0.90 | 0.04 |

Additional experiments have been performed to determine whether phosphoric acid corresponding to solution S could be used directly to produce dicalcium phosphate and thereby avoid part of the above-described cyclic process. The results of these experiments show that where one would expect to form dicalcium phosphate, only monocalcium phosphate was formed. The experiments used phosphoric acid concentrations of 27.5%, 34%, 42% and 55%, and acidulation ratios ($H_6P_2O_5$) of 1.36, 2.16, 2.60 and 3.0. Although the mechanism of the method is improperly understood, it is believed that the minute amounts of calcium sulfate in solution S contribute to the operability of the process for the direct production of dicalcium phosphate.

It will be appreciated the procedure does not necessarily claim pure dicalcium phosphate. Purification can be accomplished readily by dissolving out the monocalcium phosphate with water. The data of Tables VII, VIII and IX show that various ratios of dicalcium phosphate to monocalcium phosphate result. The monocalcium phosphate fraction is essentially the water soluble $P_2O_5$ fraction listed in these tables. The dicalcium phosphate fraction is essentially the citrate soluble $P_2O_5$ fraction. It would be noted that in Table VII these fractions show a predominance of dicalcium phosphate when the mole ratio FT/TS was 2.16.

From the foregoing, it will be seen that the inventive procedure makes it possible to directly produce dicalcium phosphate—a matter impossible in the prior art.

While in the foregoing specification we have set forth a detailed description of an embodiment of the invention, many variations in the details herein given may be made by those skilled in the art without departing from the spirit and scope of the invention.

We claim:
1. In a method of producing dicalcium phosphate by direct acidulation of phosphate rock, and wherein any contaminating monocalcium phosphate is separable by water washing, the steps of providing a mixture consisting primarily of sulfuric and phosphoric acids and having a composition defined by a position on the Solidus bondary between calcium sulfate and the acid solution associated therewith in a quaternary system including

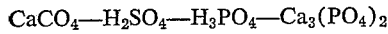
$CaCO_4$—$H_2SO_4$—$H_3PO_4$—$Ca_3(PO_4)_2$ as seen in FIG. 6 hereinabove, adding phosphate rock to said mixture in an amount sufficient to form solid dicalcium phosphate and a second mixture comprising sulfuric and phosphoric acids, the molar acidulation ratio $H_6/P_2O_5$ in the rock adding step being about 2.16, said second mixture having a composition defined by a position on the Solidus boundary between $CaHPO_4$ and the acid solution associated therewith in said quaternary system, separating said solid dicalcium phosphate from said second mixture, adding sulfuric acid to said second mixture in an amount sufficient to form solid calcium sulfate and the first-mentioned mixture, and separating said solid calcium sulfate from said first mixture with the temperature of the entire cyclic reaction being at about 145° C., with the mole concentration of free water per 2 moles of $H_6(SO_4)_3$, $Ca_3(SO_4)_3$, $H_6(PO_4)_2$ and $Ca_3(PO_4)_2$ in solution being about 20, the entire cyclic overall molar acidulation ratio being about 2.3, whereby the acid requirements for impurities are satisfied, the sulfuric and phosphoric acids mixture having a composition according to the following tabulation:

| $H_6(PO_4)_2$ | $Ca_3(PO_4)_2$ | $H_6(SO_4)_3$ | $Ca_3(SO_4)_3$ |
|---|---|---|---|
| 1.0 | 0.04 | 0.96 | 0.00 |
| 0.995 | 0.06 | 0.94 | 0.005 |
| 0.99 | 0.08 | 0.92 | 0.01 |
| 0.98 | 0.09 | 0.91 | 0.02 |
| 0.96 | 0.10 | 0.90 | 0.04 |

References Cited
UNITED STATES PATENTS
2,021,527  11/1935  Suchy et al. _____ 23—109

OSCAR R. VERTIG, Primary Examiner.

L. A. MARSH, Assistant Examiner.